W. GOODWIN.
VALVE.
APPLICATION FILED JAN. 17, 1919.
1,325,087.
Patented Dec. 16, 1919.
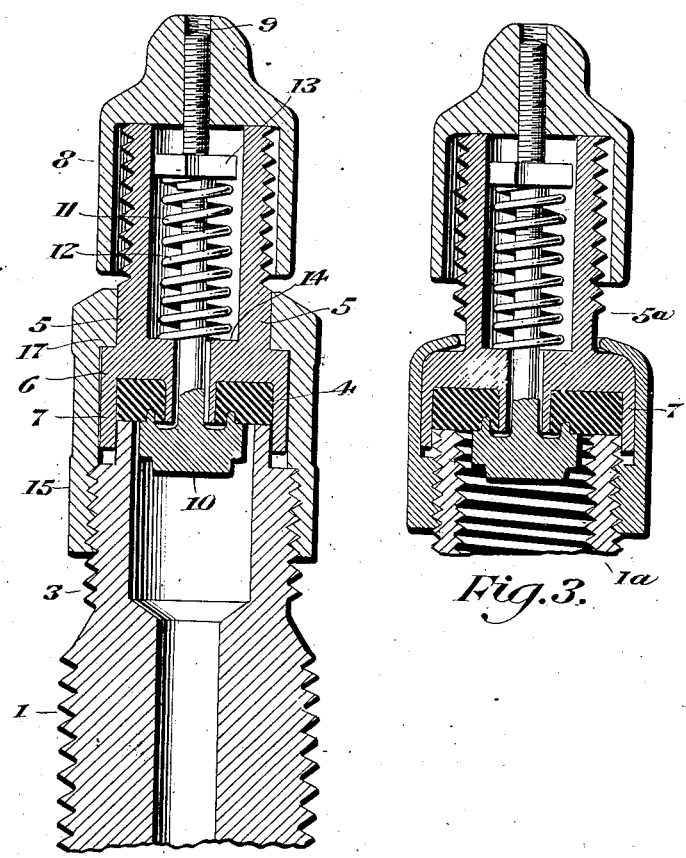
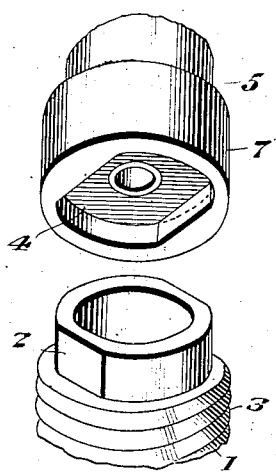
WITNESSES:
INVENTOR
William Goodwin
BY
Victor J. Evans
ATTORNEY

UNITED STATES PATENT OFFICE.

WILLIAM GOODWIN, OF PETERBORO, ONTARIO, CANADA, ASSIGNOR TO THOMAS A. LOW, OF RENFREW, ONTARIO, CANADA.

VALVE.

1,325,087.  Specification of Letters Patent.  Patented Dec. 16, 1919.

Application filed January 17, 1919. Serial No. 271,635.

*To all whom it may concern:*

Be it known that I, WILLIAM GOODWIN, a subject of the King of England, residing at Peterboro, in the Province of Ontario and Dominion of Canada, have invented new and useful Improvements in Valves, of which the following is a specification.

My present invention pertains to valves designed more especially for use in conjunction with the inflatable tubes of pneumatic tires; and it consists in a valve in which distortion and impairment of the rubber valve seat is effectually prevented, and in which the leakage of air is precluded when the valve is closed.

The invention will be fully understood from the following description and claims when the same are read in connection with the drawings hereby made a part hereof, in which:

Figure 1 is a diametrical section illustrative of one embodiment of my invention.

Fig. 2 comprises disconnected perspectives of parts of the valve.

Fig. 3 is a view of a modification hereinafter specifically referred to.

Referring by numerals to the said drawings, and more particularly to Figs. 1 and 2 thereof:

1 is an air tube designed for connection with the inflatable tube of a pneumatic tire and having its end flattened as indicated by 2, or otherwise rendered of angular form in cross-section, and also having an exterior thread 3.

Superimposed on the end of the tube 1 is an annular valve-seat 4, of rubber or other resilient material, and superimposed, in turn, on the valve-seat 4 is a tubular element 5 having a flange 6, and a skirt 7; the inner side of the inner end portion of said skirt 7 and the end 2 of the tube 1 being shaped as best shown in Fig. 2, in order to hold the tubular element 5 against turning on the tube 1, while permitting said tubular element 5 to move in the direction of its length on the tube 1. Over the tubular element 5 is a cap 8 having a longitudinally threaded aperture 9.

At 10 is a valve body disposed against the inner side of the rubber seat 4. The said body 10 is carried by a stem 11 which is extended through the central opening in the seat 4 and also through the tubular member 5 and is equipped with a spring 12, interposed between an extension nut 13 threaded on the stem, and an abutment 14 provided in the tubular member 5.

At 15 is a loose nut that is threaded at 16 to engage the thread 3 of the tube 1. Said nut 15 is provided at 17 with an inturned flange that is opposed to the outer side of the flange 6 of the tubular member 5.

The rubber seat 4 snugly occupies the skirt or depending portion 7 of the tubular member 5 and is confined by the same. It will also be noticed that when the valve body 10 is drawn outwardly against the rubber seat 4, the tubular member 5 and the rubber valve seat 4 will be securely held against turning about their axes, and hence distortion and impairment of the rubber valve seat 4 will be precluded. Again it will be noticed that the pressure of the valve body 10 against the valve seat 4 will be attended by spreading or expansion of the valve seat 4, and in consequence the flange 6 of the tubular member 5 will be caused to bind against the flange 17 of the nut 15. It will be manifest here that the nut 15 affords an abutment to confine the tubular member 6 and the valve seat 4, without interfering with the described movements of the tubular member 5; also, that the nut 15 serves in effect as a coupling nut for the connection of the tubular member 5 to the tube 1 without turning of the tubular member 5 or the rubber valve seat 4. Because of the comparatively great friction between the valve-seat 4 and the end of the tube 1, the flanges 6 and 17 will be caused to tightly bind against each other, and the cap 8 will also be caused to bind, with the result that there is no vibration between the parts, and hence no liability of the cap being casually displaced.

I prefer to make the valve body 10 of such construction that a portion of the same penetrates the rubber seat 4. From this and the described arrangement of the rubber seat 4, it will be observed that the seat 4 serves as a valve seat and also as packing in which because of the broken joints leakage of air between the valve seat and the end of the tube 1 is precluded.

In the modification shown in Fig. 3, the tube 1ᵃ is of the well known Schrader type, and the interior of the skirt 7ᵃ of the tubular member 5ᵃ is not of angular form in cross-section. Fig. 3 makes clear the applicability of my improvement to the well known Schrader type of air tube without entailing any change whatever in the latter.

Having described my invention, what I claim and desire to secure by Letters-Patent, is:

1. A valve construction comprising a flanged nut, a flanged and skirted tubular member in said nut with the flanges opposed and the skirt of the tubular member at the inner side of the nut, an annular packing member disposed within the skirt of the tubular member and separated by said skirt from the nut, a valve body arranged at the inner side of said packing member and having a threaded stem that extends through said member, and means engaging the threaded stem for drawing the valve body against the packing member.

2. A valve construction comprising a flanged nut, a flanged and skirted tubular member in said nut with the flanges opposed and the skirt of the tubular member at the inner side of the nut, an annular packing member disposed within the skirt of the tubular member and confined by said skirt and separated through the medium of the same from the nut, a valve body arranged at the inner side of the packing member and having a portion adapted to penetrate said member and also having a threaded stem that extends through the member, and threaded means engaging said stem for pressing the valve body against the inner side of the packing member.

3. A valve construction comprising a flanged nut, a flanged and skirted tubular member in said nut, annular packing disposed within the skirt of the tubular member, a valve body arranged at the inner side of said packing and having a threaded stem that extends through the packing, an extension nut on the stem, a spring interposed between said nut and an abutment in the tubular member, and threaded means engaging the stem and the tubular member for pressing the valve body against the packing member.

4. In a valve construction, the combination of an exteriorly threaded tube, a nut mounted thereon and having a flange, a flanged and skirted tubular member in said nut with the flanges opposed, annular packing arranged on the end of the tube and within the skirt of the tubular member, a valve body at the inner side of said packing and having a threaded stem that extends through the same, an extension nut on the stem, a spring interposed between said nut and an abutment in the tubular member, and means engaging the threaded stem and bearing on the tubular member for pressing the valve body against the packing member.

5. A valve construction comprising a flanged nut, a flanged and skirted tubular member in said nut with the flanges opposed and the skirt at the inner side of the nut; the inner end portion of the skirt being contracted, annular packing within the skirt of the tubular member and arranged outwardly beyond the contracted inner end portion of the skirt, a valve body arranged at the inner side of said packing and having a threaded stem that extends through the same and also through the tubular member, and threaded means on said stem for pressing the valve body outwardly against the packing member.

6. A valve construction comprising coupling means, an annular packing member, means opposed to the coupling means and in which the packing member is confined and separated from the coupling means, a valve body opposed to the inner side of the packing member and having a threaded stem extended through the packing member, and threaded means for coöperating with the valve stem and the housing member to bind said member against the coupling member.

7. A valve construction comprising coupling means, an annular packing member, means opposed to the coupling means and in which the packing member is housed; said means being shaped to key it to a tube and thereby prevent turning of said means and the packing member thereon on the tube, a valve body opposed to the inner side of the packing member and having a threaded stem extended through said member, and threaded means for coöperating with the valve stem and the housing means to bind said housing means against the coupling means.

In testimony whereof I affix my signature.

WILLIAM GOODWIN.